US010353162B1

(12) United States Patent
Zhou et al.

(10) Patent No.: US 10,353,162 B1
(45) Date of Patent: Jul. 16, 2019

(54) DETACHABLE MOUNTING CAP AND FIBER OPTIC DISTRIBUTION BOX HAVING THE SAME

(71) Applicant: Amphenol Fiber Optic Technology (Shenzhen) Co., Ltd., Shenzhen, Guangdong Province (CN)

(72) Inventors: Jinan Zhou, Shenzhen (CN); Songsheng Li, Shenzhen (CN); Jun Wen, Shenzhen (CN); Linghua Zhu, Shenzhen (CN); David Frey, Shenzhen (CN); Anh Nguyen, Shenzhen (CN); Shu-Hui Hsu, Kaohsiung (TW)

(73) Assignee: Amphenol Fibert Optic Technology (Shenzhen) Co., Ltd., Shenzhen, Guangdong Province (CN)

( * ) Notice: Subject to any disclaimer, the term of this patent is extended or adjusted under 35 U.S.C. 154(b) by 0 days.

(21) Appl. No.: 16/299,304

(22) Filed: Mar. 12, 2019

Related U.S. Application Data

(62) Division of application No. 15/979,941, filed on May 15, 2018.

(30) Foreign Application Priority Data

Jan. 2, 2018 (TW) ............................ 107200010 U

(51) Int. Cl.
*G02B 6/44* (2006.01)

(52) U.S. Cl.
CPC ......... *G02B 6/4442* (2013.01); *G02B 6/4452* (2013.01)

(58) Field of Classification Search
CPC ............................ G02B 6/4442; G02B 6/4452
See application file for complete search history.

(56) References Cited

U.S. PATENT DOCUMENTS

| | | | | |
|---|---|---|---|---|
| 5,892,870 | A | 4/1999 | Fingler et al. | |
| 5,903,698 | A | 5/1999 | Poremba et al. | |
| 6,760,531 | B1 | 7/2004 | Solheid et al. | |
| 7,013,074 | B2 * | 3/2006 | Battey .................. | G02B 6/3897 385/135 |
| 7,120,347 | B2 | 10/2006 | Blackwell, Jr. et al. | |
| 7,356,237 | B2 | 4/2008 | Mullaney et al. | |
| 7,488,205 | B2 * | 2/2009 | Spisany ................... | H04Q 1/13 385/135 |
| 7,489,849 | B2 | 2/2009 | Reagan et al. | |
| 7,753,596 | B2 * | 7/2010 | Cox ..................... | G02B 6/4466 385/135 |
| 7,844,158 | B2 | 11/2010 | Gronvall et al. | |
| 8,532,490 | B2 | 9/2013 | Smith et al. | |
| 9,977,211 | B1 * | 5/2018 | Courchaine .......... | G02B 6/4446 |
| 2009/0202214 | A1 * | 8/2009 | Holmberg ............ | G02B 6/4446 385/135 |

* cited by examiner

*Primary Examiner* — Daniel Petkovsek

(74) *Attorney, Agent, or Firm* — Muncy, Geissler, Olds & Lowe, P.C.

(57) ABSTRACT

A detachable mounting cap includes a hollow cap body and a mount hole formed inside the hollow cap body. The hollow cap body is configured to detachably connect a box body of a fiber optic distribution box, and includes a cap bottom surface configured to lie on the box body, and a front inclined cap surface inclinedly extending upward from the cap bottom surface and configured to be inclined with respect to the box body. The mount hole extends through the front inclined cap surface and the cap bottom surface, and is configured to communicate with a through hole of the box body and to detachably mount the fiber optic connector.

6 Claims, 7 Drawing Sheets

DETACHABLE MOUNTING CAP AND FIBER OPTIC DISTRIBUTION BOX HAVING THE SAME

CROSS-REFERENCE TO RELATED APPLICATION

This is a divisional application of U.S. patent application Ser. No. 15/979,941, filed on May 15, 2018, which claims priority of Taiwanese Patent Application No. 107200010, filed on Jan. 2, 2018.

FIELD

The disclosure relates to a distribution box, and more particularly to a fiber optic distribution box for connecting a fiber optic cable to fiber optic connectors.

BACKGROUND

For a fiber optic distribution application, optical fibers of a fiber optic cable are spread in connection with a plurality of fiber optic connectors. To facilitate storage and connection, the fiber optic cable is received in a fiber optic distribution box, and the fiber optic connectors are mounted to the fiber optic distribution box.

As shown in FIG. 1, in order for allowing optical fibers (not shown) to extend at a specific angle, a fiber optic distribution box 1 has a plurality of inclined surfaces 11 inclined at the specific angle. The inclined surfaces 11 are respectively connected to fiber optic connectors 12, such that the optical fibers can extend at the specific angle through the fiber optic connectors 12.

However, each inclined surface 11 is formed unitarily as one piece with the fiber optic distribution box 1. When it is necessary to provide a different optical fiber output angle, a new fiber optic distribution box has to be manufactured, thereby increasing manufacture costs and causing disadvantages for modularization. Further, the fiber optic distribution box 1 is unable to match with different types of fiber optic connectors, thereby reducing its usability for general applications.

SUMMARY

Therefore, an object of the disclosure is to provide a detachable mounting cap that is configured for detachably connecting a fiber optic connector to a fiber optic distribution box and that can alleviate at least one of the drawbacks of the prior art.

Accordingly, a detachable mounting cap for detachably connecting a fiber optic connector to a fiber optic distribution box includes a hollow cap body that is configured to detachably connect a box body of the fiber optic distribution box, and a mount hole formed inside the hollow cap body.

The hollow cap body includes a cap bottom surface configured to lie on the box body, and a front inclined cap surface inclinedly extending upward from the cap bottom surface and configured to be inclined with respect to the box body.

The mount hole extends through the front inclined cap surface and the cap bottom surface, and is configured to communicate with a through hole of the box body and to detachably mount the fiber optic connector.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
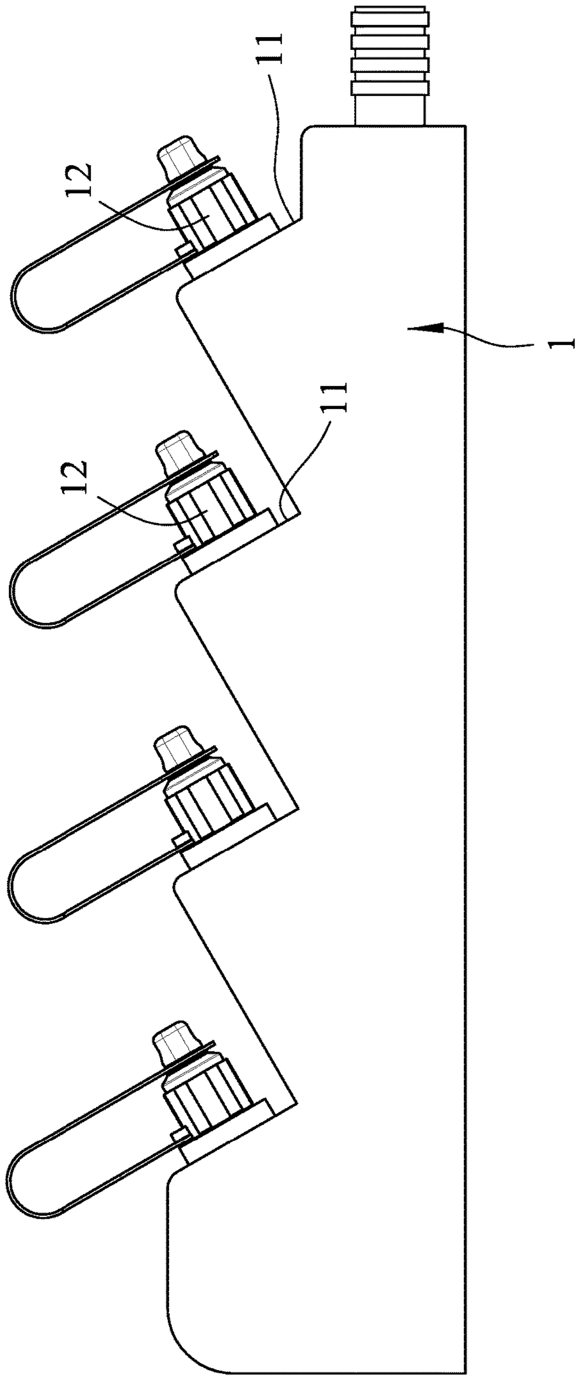
FIG. 1 is a side view of a conventional fiber optic distribution box.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
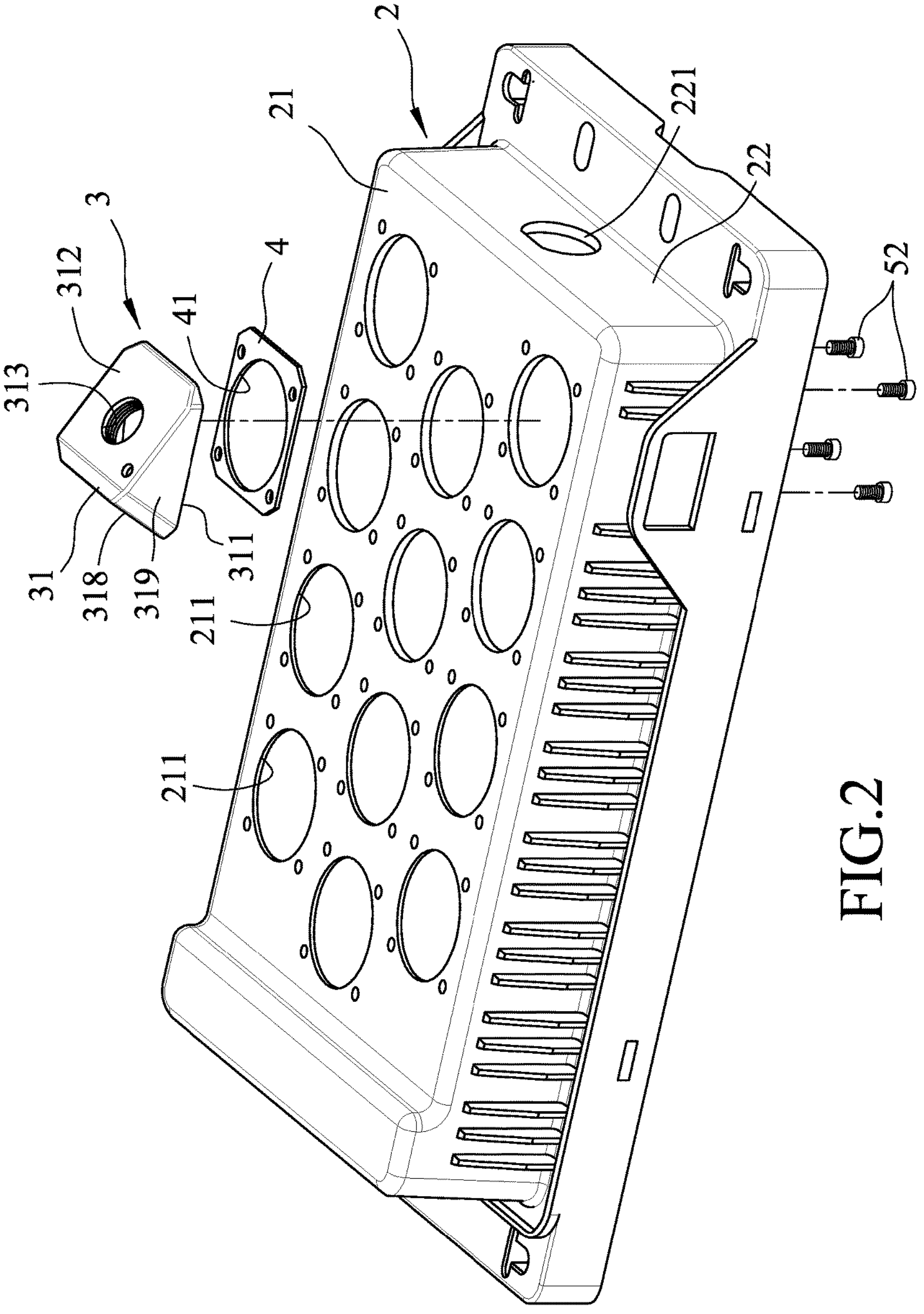
FIG. 2 is a perspective view of a fiber optic distribution box according to an embodiment of the present disclosure.
Figure 3:
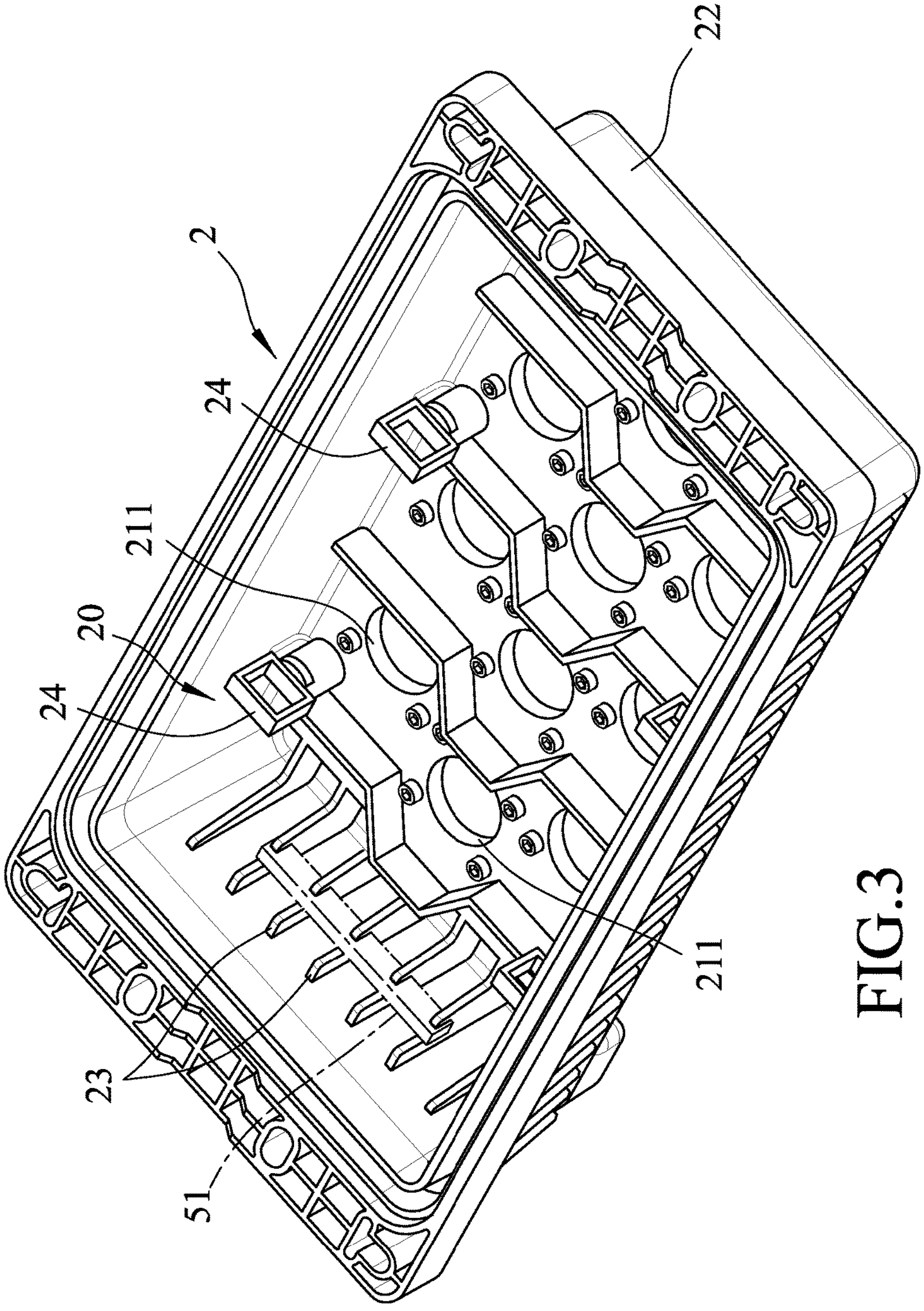
FIG. 3 is another perspective view of the embodiment, viewed from a bottom side.

Referring to FIGS. 2 and 3, a fiber optic distribution box according to an embodiment of the present disclosure includes a box body 2, a plurality of detachable mounting caps 3 (only one is shown in FIG. 2), and a plurality of packing rings 4 (only one is shown in FIG. 2).

The box body 2 has a box terminal wall 21 and a surrounding box wall 22 perpendicularly connected to the box terminal wall 21. In this embodiment, the surrounding box wall 22 extends downwardly from the periphery of the box terminal wall 21. The box terminal wall 21 and the surrounding box wall 22 cooperatively bound a cable reception space 20. The box terminal wall 21 is formed with a plurality of spaced-apart through holes 211 communicating with the cable reception space 20. The box terminal wall 21 is flat so that the through holes 211 lie in a same plane. The surrounding box wall 22 is formed with an input hole 221 communicating with the cable reception space 20. As shown in FIG. 3, retaining members 23 are disposed in the cable reception space 20. The retaining members 23 not only can serve as structural reinforcement ribs, but also can be used to mount PLC splitters 51 (as indicated by the phantom lines) or cable hubs 24.

Figure 4:
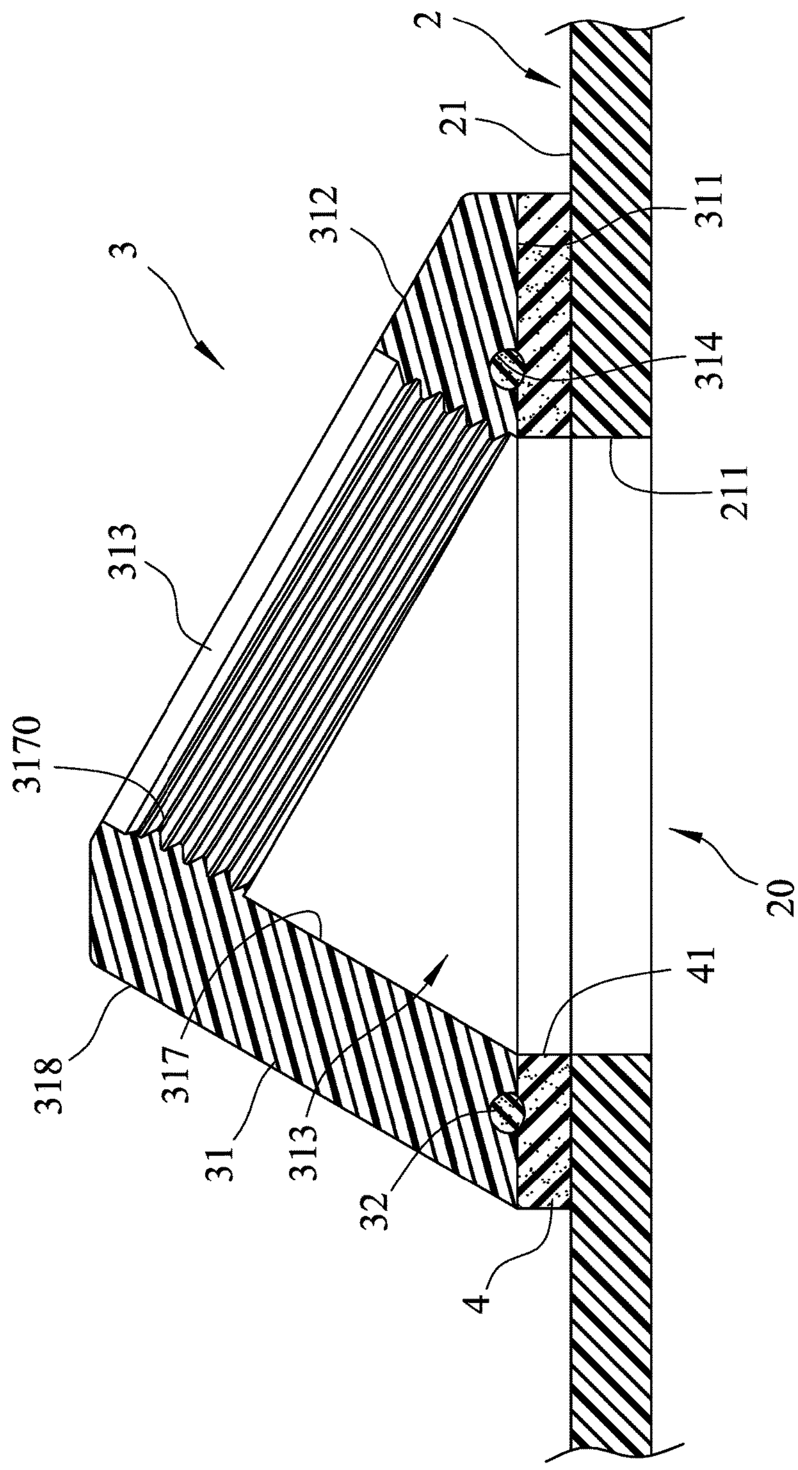
FIG. 4 is a fragmentary sectional view of the embodiment, illustrating a detachable mounting cap, a packing ring and a box body of the fiber optic distribution box in an assembled state.

Referring to FIG. 4, in combination with FIG. 2, the detachable mounting caps 3 are disposed respectively on the through holes 221 and connected detachably to the box terminal wall 21. Each detachable mounting cap 3 has a hollow cap body 31, a mount hole 313 formed inside the hollow cap body 31, and a seal ring 32. The hollow cap body 31 is detachably mounted to the box terminal wall 21. The hollow cap body 31 includes a cap bottom surface 311, a front inclined cap surface 312, a recess 314, a rear inclined cap surface 318, and two spaced apart opposite side surfaces 319. The cap bottom surface 311 lies on the box terminal wall 21 immediately above a respective one of the through holes 221. The front inclined cap surface 312 inclinedly extends upward from the cap bottom surface 311 and is inclined with respect to the box terminal wall 21. The mount hole 313 extends through the front inclined cap surface 312 and the cap bottom surface 311 to communicate with the cable reception space 20 via the respective through hole 211. The recess 314 is indented from the cap bottom surface 311 and surrounds the mount hole 313. The rear inclined cap surface 318 inclinedly extends upward from the cap bottom surface 311 oppositely of the front inclined cap surface 312 and has a top end meeting a top end of the front inclined cap surface 312. Each of the side surfaces 319 is connected between the front and rear inclined cap surfaces 312, 318. In this embodiment, the hollow cap body 31 further includes an inner surrounding surface 317 bounding the mount hole 313. The inner surrounding surface 317 has an internal thread 3170. The seal ring 32 is received in the recess 314 and is disposed between the cap bottom surface 311 and a respective one of the packing rings 4 to provide a seal between the cap bottom surface 311 and the respective packing ring 4. In alternative embodiments, the packing rings 4 are omitted, and each seal ring 32 is received in the respective recess 314 and is disposed between the respective cap bottom surface 311 and the box terminal wall 21 to provide a seal between the cap bottom surface 311 and the box terminal wall 21.

In this embodiment, each packing ring 4 is disposed removably between the box terminal wall 21 and the cap bottom surface 311 of a respective one of the detachable mounting caps 3. Each packing ring 4 has a ring hole 41 aligned in communication with the mount hole 313 of the respective detachable mounting cap 3 and the respective through hole 211 of the box body 2, so that the mount hole 313 can communicate the cable reception space 20. A bottom end of each packing ring 4 abuts the box terminal wall 21, and a top end of each packing ring 4 abuts the cap bottom surface 311 of the hollow cap body 31 and the seal ring 32. Alternatively, the diameter of the ring hole 41 may be enlarged such that the seal ring 32 is situated within the respective packing ring 4 and abuts the box terminal wall 21. Four screws 52 (FIG. 2) are disposed within the cable reception space 20. Each screw 52 extends upwardly through the box terminal wall 21 and the respective packing ring 4 and is threaded into the respective detachable mounting cap 3. Each packing ring 4 may be made from, but not limited to, a rubber or resilient material. With the compressible property of such a material, an effective seal can be provided between the cap bottom surface 311 and the box terminal wall 21.

The detachable mounting caps 3 may be provided with different configurations to match with different kinds of fiber optic connectors, and may be exchangeably mounted to the box body 2. Two configurations of the detachable mounting caps 3 are respectively shown in FIGS. 5 and 6.

Figure 5:
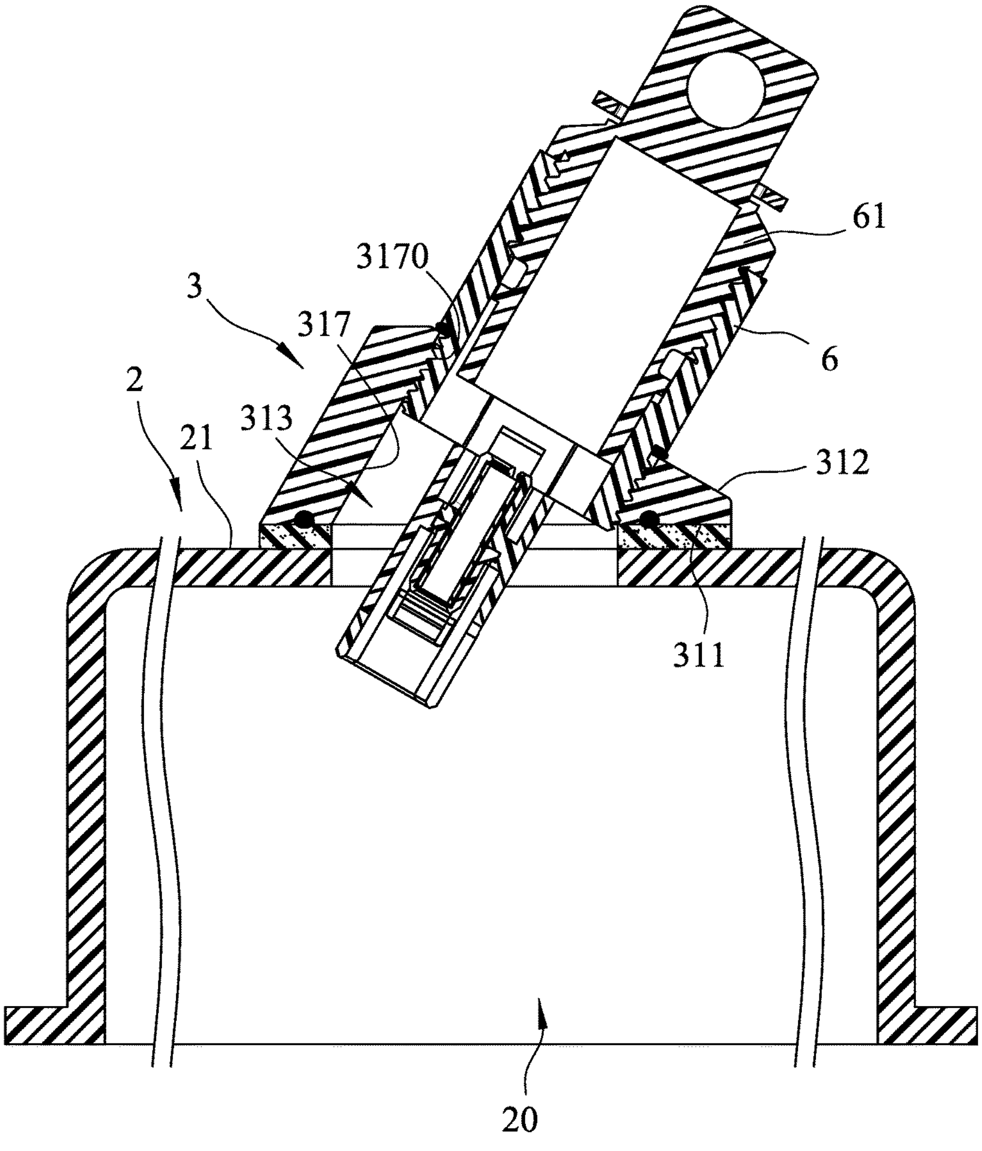
FIG. 5 is a fragmentary sectional view of the embodiment, illustrating a fiber optic connector mounted to the fiber optic distribution box.

Referring to FIG. 5, the detachable mounting cap 3 threadedly connects a fiber optic connector 6 through the internal thread 3170. A bottom end of the fiber optic connector 6 is inclinedly inserted into the cable reception space 20 in a direction substantially perpendicular to the front inclined cap surface 312 of the detachable mounting cap 3 and is inclined with respect to the box terminal wall 21. When a dust cap 61 of the fiber optic connector 6 is opened, optical fibers (not shown) in the cable reception space 20 are allowed to extend outwardly at a specific angle through the fiber optical connector 6 for external connection. In order to avoid excessive bends of the optical fibers, an inclining angle between the cap bottom surface 311 and the front inclined cap surface 312 may be arranged to range between 10 degrees and 60 degrees. The detachable mounting caps 3 may be manufactured with different inclining angles of the front inclined cap surfaces 312 and different sizes of the mount holes 313, and may be exchangeably mounted to the box body 2 to meet the needs of different fiber optic connectors 6.

Figure 6:
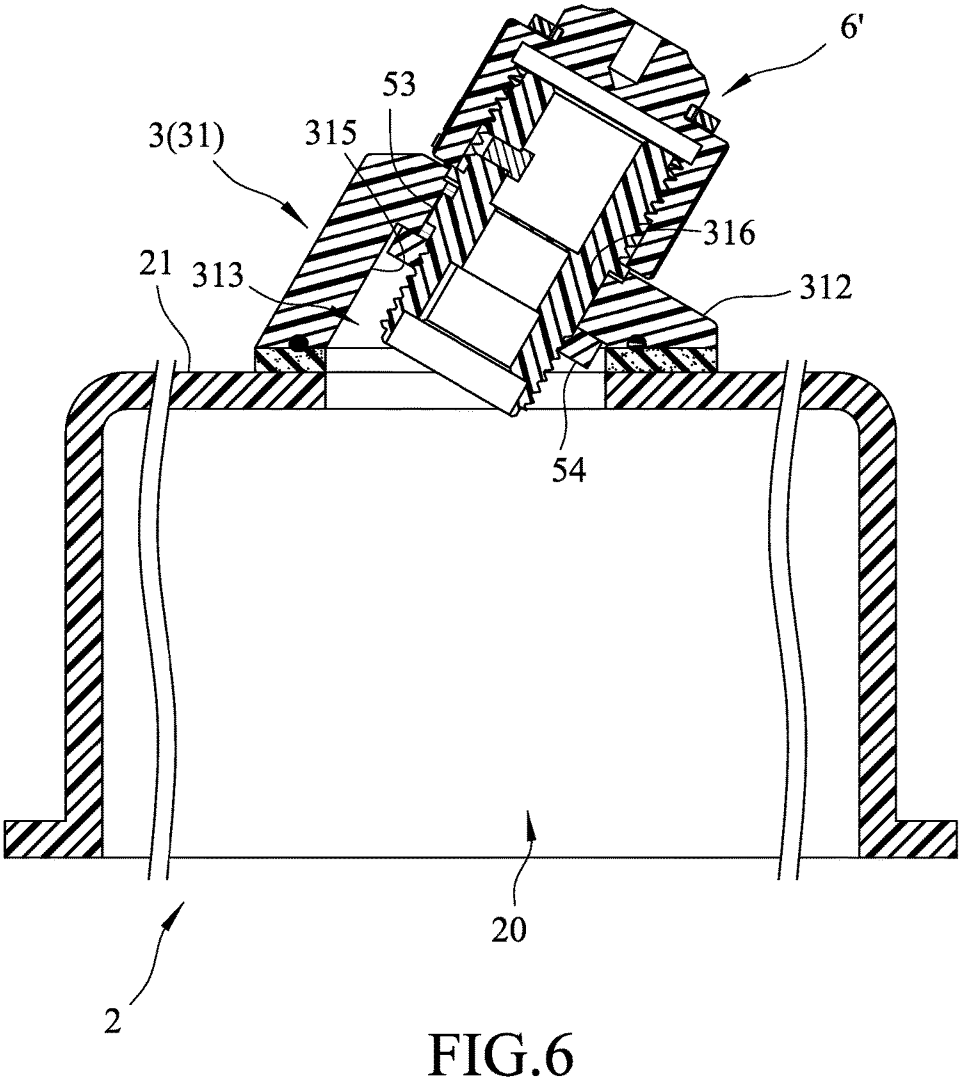
FIG. 6 is a fragmentary sectional view of the embodiment, illustrating another fiber optic connector mounted to the fiber optic distribution box.

Referring to FIG. 6, another fiber optic connector 6' is connected to the detachable mounting cap 3. The mount hole 313 of the detachable mounting cap 3 has a first hole portion 315 and a second hole portion 316. The first hole portion 315 penetrates the cap bottom surface 311 and extends upwardly away from the box terminal wall 21 of the box body 2. The second hole portion 316 connects the first hole portion 315 and penetrates the front inclined cap surface 312. The second hole portion 316 is smaller in cross section than the first hole portion 315. The fiber optic connector 6' has a portion, which is greater in cross section than the second hole 316 and which is retained on the detachable mounting cap 3. To fix the fiber optic connector 6' to the detachable mounting cap 3, a coupling key 53 is used to position the fiber optic connector 6', and a clamp 54 that is greater in cross section than the second hole portion 316 but smaller than the first hole portion 315 is threadedly attached to a base section of the fiber optic connector 6' to provide a clamping force to secure the fiber optic connector 6'.

Figure 7:
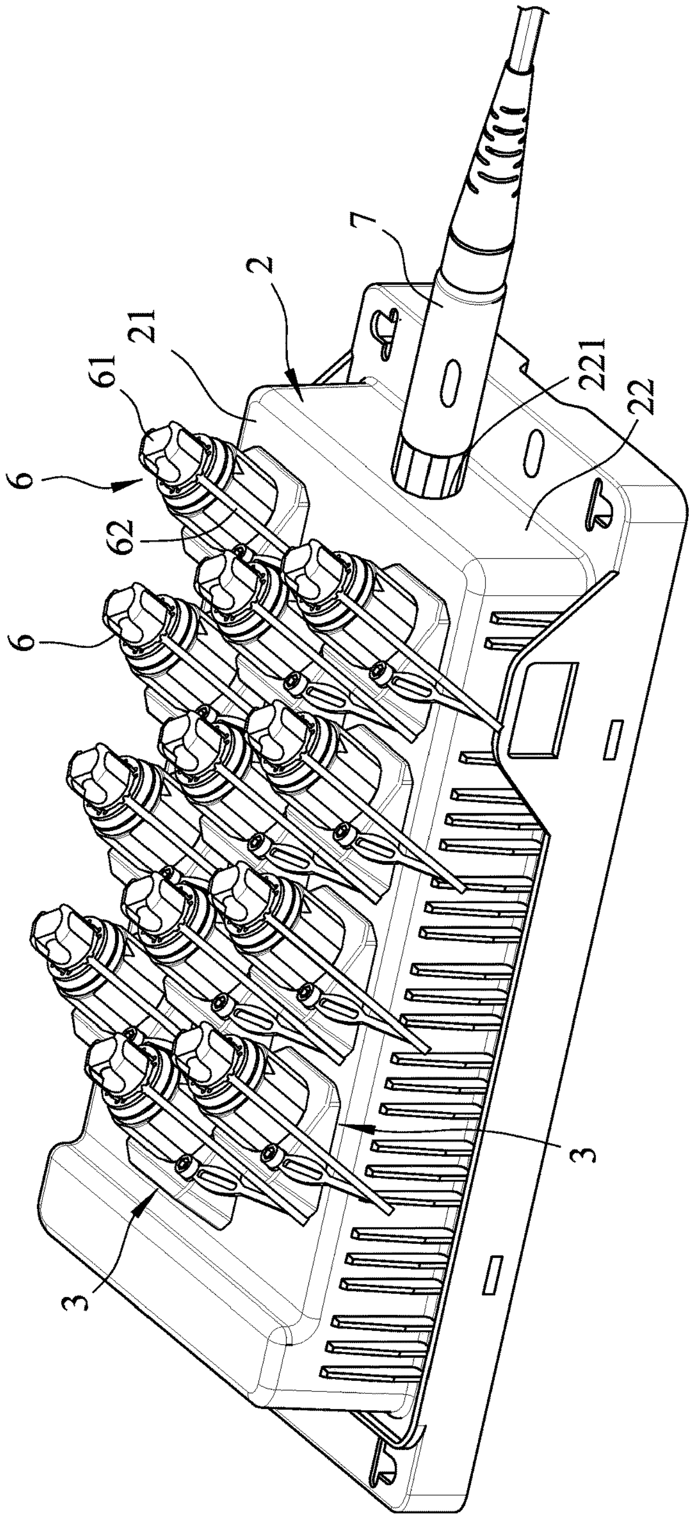
FIG. 7 is a perspective view of the embodiment, illustrating the fiber optic distribution box in use.

Referring to FIG. 7, in combination with FIG. 5, a fiber optic cable 7 is inserted into the cable reception space 20 through the input hole 221 of the box body 2. The detachable mounting caps 3 are connected to the fiber optic connectors 6. The fiber optic connectors 6 are inclined at particular angles with respect to the box terminal wall 21. In that manner, optical fibers of the fiber optic cable 7 in the cable reception space 20 are distributed to the fiber optic connectors 6, through which the optical fibers exit at particular inclining angles. On the other hand, the dust cap 61 of each fiber optic connector 6 is connected to one end of a tether 62. The other end of the tether 62 is connected to the front inclined cap surface 312 of the respective detachable mounting cap 3. Because the detachable mounting caps 3 are detachable from the box body 2, the detachable mounting caps 3 having different configurations may be exchanged to match with desired fiber optic connectors, or to allow optical fibers to exit at desired inclining angles. The box body 2 is a common component that can be used commonly for different kinds of fiber optic connectors. By providing the common box body 2, manufacture costs may be reduced and general usability may be improved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A detachable mounting cap for detachably connecting a fiber optic connector to a fiber optic distribution box, comprising:

a hollow cap body that is configured to detachably connect a box body of the fiber optic distribution box; and a mount hole formed inside said hollow cap body, said hollow cap body including a cap bottom surface configured to lie on the box body, and a front inclined cap surface inclinedly extending upward from said cap bottom surface and configured to be inclined with respect to the box body, and said mount hole extending through said front inclined cap surface and said cap bottom surface, and configured to communicate with a through hole of the box body and to detachably mount the fiber optic connector.

2. The detachable mounting cap as claimed in claim 1, wherein said hollow cap body further includes a rear inclined cap surface that inclinedly extends upward from said cap bottom surface oppositely of said front inclined cap surface and that has a top end meeting a top end of said front inclined cap surface, and two opposite side surfaces each of which is connected between said front and rear inclined cap surfaces.

3. The detachable mounting cap as claimed in claim 1, wherein said hollow cap body further includes an inner surrounding surface bounding said mount hole, said inner surrounding surface having an internal thread configured to threadedly connect the fiber optic connector.

4. The detachable mounting cap as claimed in claim 1, wherein said mount hole has a first hole portion and a second hole portion, said first hole portion penetrating said cap bottom surface and extending toward said inclined surface, said second hole portion connecting said first hole portion and penetrating said front inclined cap surface, said second hole portion being smaller in cross section than said first hole portion.

5. The detachable mounting cap as claimed in claim 1, wherein said hollow cap body further includes a recess that is indented from said cap bottom surface and that surrounds said mount hole, and a seal ring that is received in said recess and that is configured to provide a seal between said cap bottom surface and the box body.

6. The detachable mounting cap as claimed in claim 1, wherein an inclining angle between said cap bottom surface and said front inclined cap surface ranges between 10 degrees and 60 degrees.

* * * * *